United States Patent Office 3,171,008
Patented Feb. 23, 1965

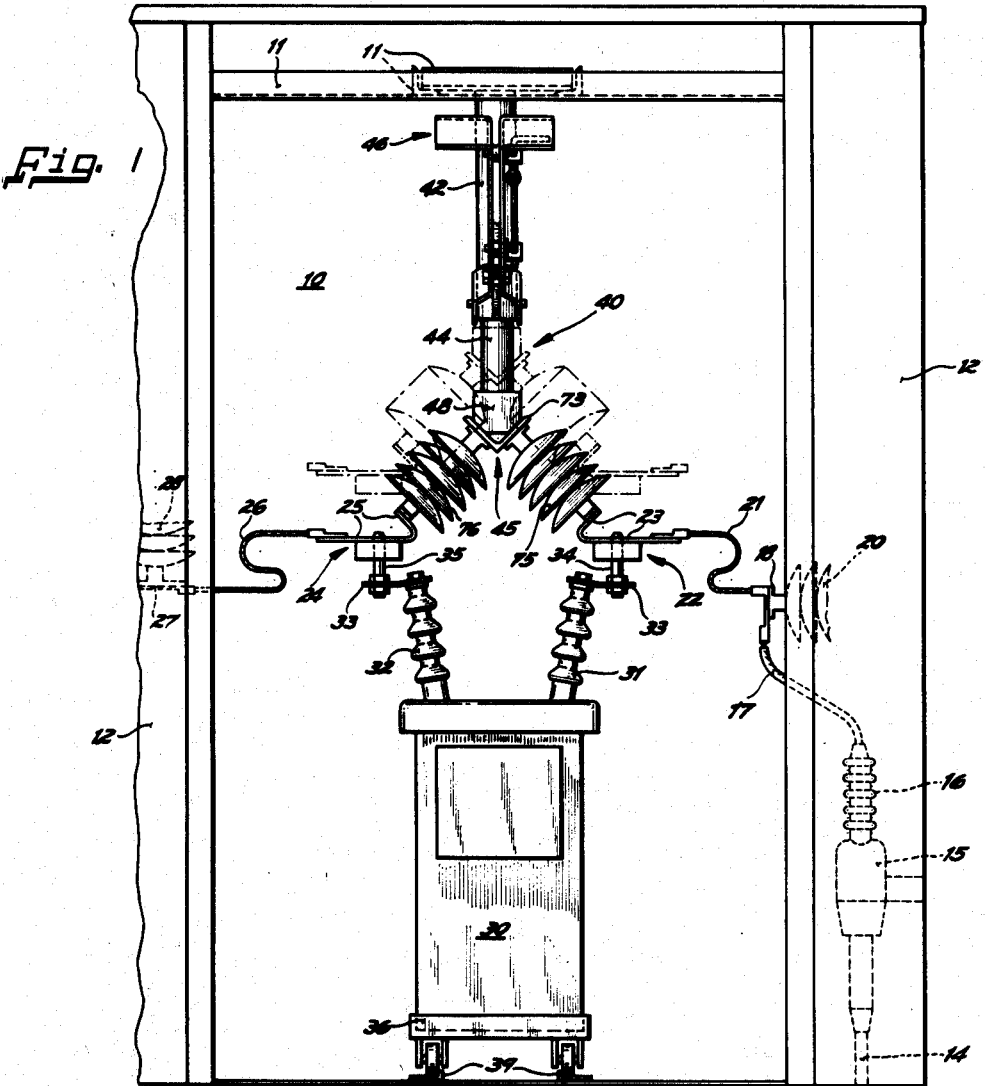

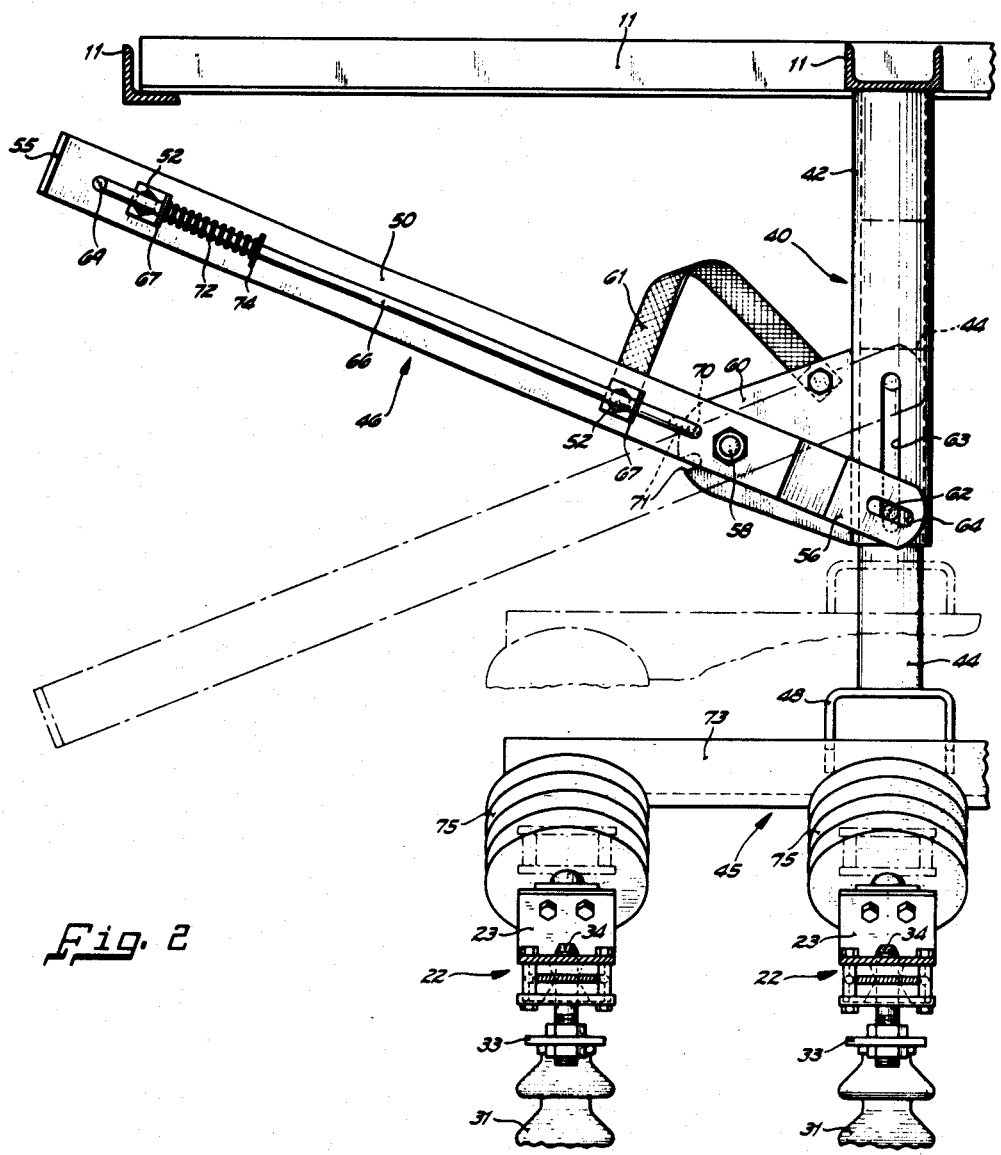

3,171,008
LATCHABLE RAISING AND LOWERING MEANS FOR DISCONNECTING SWITCH OF METAL ENCLOSED SWITCHGEAR
Davis M. Phillips, South Milwaukee, Wis., assignor to McGraw-Edison Company, Milwaukee, Wis., a corporation of Delaware
Filed Nov. 22, 1961, Ser. No. 154,305
3 Claims. (Cl. 200—169)

This invention relates to metal enclosed switchgear and more particularly to disconnecting means for a metal enclosed circuit breaker.

In switchgear assemblies of the type wherein a circuit breaker is mounted on a truck for movement into and out of a metallic enclosure, means are provided for connecting the circuit breaker into the system being protected. In the type of unit commonly known as a "dropdown" assembly, the circuit breaker is operatively mounted for vertical movement into and out of a connected position with respect to stationary circuit and bus bar structure located in the upper portion of the enclosure. When such circuit breaker units are elevated, disconnect contacts carried at their upper end engage stationary contacts in the bus bar structure thereby connecting a feeder or load conductor to a line or supply conductor through the circuit breaker. Such assemblies, therefore, require expensive equipment for raising a relatively heavy circuit breaker unit vertically and for supporting it in an elevated position.

It is an object of the invention to provide a switchgear assembly having overhead disconnect contacts wherein means for elevating the circuit breaker unit and supporting it in an elevated position are not required.

Another object of the invention is to provide a switchgear assembly with vertically movable disconnect contacts which are connected to stationary circuit structure and which are engageable with disconnect contacts carried by the switchgear unit.

These and other objects and advantages of the instant invention will become more apparent from the detailed description thereof taken with the accompanying drawing in which:

FIG. 1 is an elevational view of metal enclosed switchgear embodying the present invention with parts of the metallic housing broken away;

FIG. 2 is an elevational view, partly in section, of the disconnect contact elevating mechanism;

FIG. 3 is a top view, partly in section, of the operating handle for the contact elevating mechanism.

In general terms, the invention comprises in metal enclosed switchgear, the combination of a stationary metallic supporting frame and a circuit breaker unit movable horizontally into and out of the supporting frame. In addition, first disconnect contact means are carried by the circuit breaker unit and face upwardly therefrom and second disconnect contact means are carried by the supporting frame vertically above the first contact means. Also, means are provided for moving the second disconnect contact means vertically into and out of engagement with the first disconnect contact means.

Referring now to the drawings in greater detail, FIG. 1 shows one phase of a three phase metal enclosed switchgear which includes a cubicle 10 formed of a suitable metallic supporting frame 11 and sheet metal walls 12. Power is supplied from an underground system by a cable 14 which terminates in a three phase pothead 15 having a bushing 16 for each phase to which each of the phase conductors 17 are connected. The other end of each conductor 17 is connected to a terminal 18 which is supported by and insulated from the metallic housing 10 by a porcelain insulator 20. A flexible conductor 21 connects the terminals 18 to the line movable disconnect contact 22 which are supported below the horizontal portion of an angular conductive bracket 23. Load movable disconnect contacts 24, similarly supported by brackets 25, are connected by flexible conductors 26 to load terminals 27 which are each mounted on and insulated from the metallic housing 10 by a porcelain insulator 28. Although only one phase is shown in FIG. 1, it will be understood that structure identical with that just described is provided in each phase.

A circuit breaker unit 30 is shown within the cubicle 10 and is provided with a line bushing 31 and a load bushing 32 for each phase. A conductive bracket 33, mounted atop each of the bushings 31 and 32, vertically support a rod-like line and load stationary disconnect contacts 34 and 35 respectively. A truck 36 mounted on rollers 37, is provided for moving the circuit breaker 30 horizontally into and out of the compartment 10. The rollers 37 co-operatively engage rails 39 in the floor of the cubicle 10 for guiding the circuit breaker unit 30 into vertical alignment below the movable disconnect contacts 22 and 24.

An operating mechanism 40 is provided for moving the disconnect contacts 22 and 24 vertically relative to the circuit breaker unit 30 so the latter may be connected and disconnected after it has been rolled into the enclosure 10. The operating mechanism 40 is shown in FIGS. 2 and 3 to include a pair of telescopically engageable tubular members 42 and 44, a support assembly 45 for the movable disconnect contacts 22 and 24 and an operating handle assembly 46. The tubular member 42 is rigidly affixed at its upper end to the metallic supporting frame 11 while the second tubular member 44 is provided with an inverted U-shaped bracket 48 at its lower end for carrying the movable contact support assembly 45.

The handle assembly 46 comprises a pair of elongate metallic members 50 which are secured in a parallel spaced relation by means of bolts 52 and spacers 53. The left end 55 of each of the members 50 is bent outwardly to form hand grips while the right ends 56 thereof, as viewed in FIGS. 2 and 3, is angularly shaped to embrace the opposite sides of the tube 42. The handle members 50 are pivotally mounted by means of a pivot pin 58 on a pivot plate 60 which is affixed to the upper tube 42. A flexible conductive strap 61 grounds the handle 46 to the frame 11 through the tube 42 and the plate 60.

The tubes 42 and 44 are slidably coupled by means of a pair of pins 62 affixed to the opposite sides of the lower tube 44 and which extend through an elongate longitudinal slot 63 near the lower end of the tube 42 and also through a short longitudinal slot 64 in the end 56 of each of the members 50. It can be seen, therefore, from FIG. 2 that counterclockwise pivotal movement of the operating handle assembly 46 from its full position to its phantom position will telescope the lower tubular member 44 upwardly into the upper tubular member 42 to thereby raise the support assembly 45 from its full position to its phantom position. It will be appreciated also that the opposite ends of the slots 63 will provide stops to limit the pivotal movement of the operating handle assembly 46.

A lock rod 66 is mounted adjacent one of the elongate handle members 50 by means of perforated bracket members 67. The left end 69 of the lock rod 66, as viewed in FIG. 3, is bent outwardly parallel to the end 55 of its adjacent handle member 50 to provide a hand grip while its right end 70 is bent in the opposite direction to extend through apertures formed in each of the handle members 50. In addition, the pivot plate 60, as seen in FIG. 2, is provided with a pair of notches 71 facing outwardly in a direction parallel to the extreme positions of the handle assembly 46 to receive the inwardly bent end 70 of the lock rod 66. A spring 72 circumjacent the rod 66 and compressed between one of the bracket members 67 and a flange 74 extending outwardly from the rod 66, urges end 70 toward engagement with the notches 71.

It will be appreciated from the foregoing that when it is desired to raise the movable disconnect contacts 22 and 24, the hand grip 69 of rod 66 is pulled toward the left as is viewed in FIGS. 2 and 3 to draw the opposite end 70 out of the upper notch 71 in the pivot plate 60 and then the handle assembly 46 is rotated to its phantom position in FIG. 2 whereupon the pins 62 will engage the upper ends of the slots 63 and the end 70 of the rod 66 will be in registry with the lower notch 71. Upon the release of the rod, the spring 72 will force the end 70 into the recess 71 so that the handle assembly 46, and hence the disconnect contacts 22 and 24, will be locked in a disconnected position.

The support assembly for the movable disconnect contacts 22 and 24 includes a V-in-cross-section channel member 73 which is rigidly affixed to lower end of the U-shaped bracket 48. A plurality of porcelain insulators 75 and 76 are mounted on each of the lower surfaces of the member 73 for supporting each of the movable disconnect contact assemblies 22 and 24 respectively.

The angular conductive terminal member 23 is affixed to the lower end of each of the insulators 75 for supporting each of the line movable disconnect contact assemblies 22 in vertical alignment above the stationary disconnect contacts 32. Similarly the conductive brackets 25 are supported below the insulators 76. The specific details of the movable disconnect contacts 22 and 24 form no part of the instant invention and will not be discussed in detail herein. For a more complete discussion thereof, reference is made to application Serial No. 860,821, filed December 21, 1959, now Patent No. 3,070,770, and assigned to the assignee of the instant invention.

When it is desired to remove the circuit breaker 30 from the compartment 10, the lock rod 66 is disengaged from the upper slot 71 and the handle assembly 46 is rotated in a counterclockwise direction to its phantom position as shown in FIG. 2. This moves the movable contact assemblies 22 and 24 out of engagement with the stationary disconnect contacts 34 and 35 respectively and upward to their phantom positions shown in FIG. 1. As a result, the circuit interrupter 30 is disconnected from the line and load conductors 21 and 26 respectively and may then be removed from the cubicle 10.

Upon reinsertion of the circuit interrupter 30 into the compartment 10 it is guided by the rails 39 into a position wherein the disconnect contacts 34 and 35 are vertically below the movable contacts 22 and 24 respectively. It will be understood by those skilled in the art that stop means will be provided in the rear of the compartment 10 so that the inward movement in circuit interrupter 30 will be arrested in a position which provides such vertical alignment. The stop rod 66 is then removed from the lower slot 71 in the pivot plate 60 and the handle assembly is rotated in a clockwise direction to move the disconnect contacts 22 and 24 into engagement with the stationary disconnect contacts 34 and 35 respectively carried by the circuit interrupter 30 so that said interrupter is re-connected into the circuit being protected. Those skilled in the art will appreciate that the cubicle 10 will be provided with a front access door (not shown) for isolating the circuit breaker 30 when it is in its connected position.

While the instant invention has been shown and described and illustrated with respect to a particular type of circuit interrupter, it will be understood by those skilled in the art that the invention has application to other types of circuit interrupters as well. In addition, while only a single embodiment of the instant invention has been shown and described, other embodiments will be suggested to those skilled in the art. Accordingly, it is intended that the invention be limited only by the scope of the appended claims.

I claim:
1. In metal enclosed switchgear, the combination of a stationary metallic frame, a circuit breaker unit movable horizontally into and out of an operative position relative to said frame, means including a first elongate member vertically supported on said frame and a second elongate member slidably engaging said first member, an operating handle pivotally mounted intermediate its ends on said first member and engaging said second member for moving the same vertically upon pivotal movement, a support member mounted on the lower end of said second member for vertical movement therewith, a plurality of insulators mounted on said support member and extending downwardly therefrom, a plurality of stationary disconnect contacts carried by the circuit breaker unit and facing upwardly therefrom in vertical alignment below said insulators when said circuit breaker unit is in its operative position, a movable disconnect contact carried by each of said insulators, whereby pivotal movement of said operating handle will move each of said movable disconnect contacts into and out of engagement with one of said stationary disconnect contacts and locking means having a first portion fixedly mounted on said frame and a second portion mounted on said lever means for movement into and out of locking engagement with said first portion when said movable disconnect contacts are in each of their connected and disconnected positions.

2. In metal enclosed switchgear, the combination of a stationary metallic frame, a circuit breaker unit movable horizontally into and out of an operative position relative to said frame, a first tubular member vertically supported from its upper end on said frame, a second tubular member telescopically received in the lower end of said first member, an operating handle pivotally mounted intermediate its ends on said first tubular member and engaging said second tubular member, a support member mounted on the lower end of said second tubular member for vertical movement therewith, a plurality of insulators mounted on said support member and extending downwardly therefrom, a plurality of stationary disconnect contacts carried by the circuit breaker unit and facing upwardly therefrom in vertical alignment below said insulators when said circuit breaker unit is in its operative position, a movable disconnect contact carried by each of said insulators, whereby pivotal movement of said operating handle will simultaneously move each of said movable disconnect contacts into and out of connected and disconnected positions relative to one of said stationary disconnect contacts.

3. The combination set forth in claim 2 wherein an elongate locking rod is mounted on said handle for longitudinal movement relative thereto, a locking member fixedly mounted on said first tubular member and having a pair of spaced-apart notches located for engagement by one end of said elongate rod when said movable disconnect contacts are in each of their connected and disconnetced positions relative to said stationary disconnect contacts, and spring means urging said rod toward said locking member.

References Cited in the file of this patent

UNITED STATES PATENTS

| 1,186,378 | Christensen et al. | June 6, 1916 |
| 1,218,059 | Cope | Mar. 6, 1917 |
| 1,929,983 | Macneil | Oct. 10, 1933 |
| 2,739,205 | Florschutz et al. | Mar. 20, 1956 |

FOREIGN PATENTS

| 221,908 | Australia | June 10, 1959 |